Patented May 8, 1951

2,551,628

UNITED STATES PATENT OFFICE 2,551,628

ISOMERIZATION OF PHENOLS

Joseph E. Nickels, Pittsburgh, Pa., assignor to Koppers Company, Inc., Pittsburgh, Pa., a corporation of Delaware No Drawing. Original application October 2, 1947, Serial No. 777,582. Divided and this application May 15, 1948, Serial No. 27,372

9 Claims. (Cl. 260—624)

This invention relates to chemical processes and is particularly directed to catalytic isomerizing processes in which an alkyl phenol containing at least one isomerizable isomer is brought into contact with a catalyst comprising an aluminum fluoride at a reactive temperature sufficient to convert a portion of said isomer to another isomer.

This application is a division of my copending application, Serial No. 777,582, filed October 2, 1947.

It is known that various catalytic reactions may be effected by means of Friedel-Crafts catalysts. Aluminum chloride, for example, is commonly used for alkylations, isomerizations and like catalytic reactions. Aluminum chloride, however, cannot be utilized in fixed-bed catalysts in liquid phase reactions because of the solubility of aluminum chloride in hydrocarbons. For the same reason it is difficult to separate aluminum chloride from the catalysate in liquid phase processes. Likewise, the high vapor pressure of aluminum chloride further complicates such separations and, moreover, imposes a severe limitation on vapor phase reactions over fixed-bed catalysts. Thus, in such reactions the temperature must be maintained low or the pressure high to prevent undue loss of aluminum chloride by vaporization.

I have now found that aluminum fluorides may be utilized to effect isomerization catalysis of alkyl phenols without any of the disadvantages characteristic of aluminum chloride and related Friedel-Crafts type catalyst. Since aluminum fluoride is not a Friedel-Crafts type catalyst, (it does not alkylate for example) it is entirely unexpected to find that it has unusually high activity in promoting isomerization catalysis of alkyl phenols. This, coupled with the facts that it has very little, if any, vapor pressure and is completely insoluble in most organic compounds, makes it an unusually attractive catalyst for isomerization.

The aluminum fluorides useful in the present invention are the aluminum salts of fluorine acids, i. e., they are the aluminum salts of hydrofluoric acid per se or hydrofluoric acid in complex combination as a Werner complex. This includes such compounds as aluminum fluoride, aluminum fluosilicate, aluminum fluoborate, etc. and excludes compounds such as sodium fluoaluminate. The latter is the sodium salt of a fluoride acid; namely, hydrofluoaluminate, and within the meaning of the terms used herein is not an aluminum fluoride.

The invention may be more fully understood by reference to the following examples in which the parts are by weight.

Example I

A procatalysate consisting of ortho-cresol was vaporized and preheated to a temperature of about 500° C. The vapors were then passed through a catalyst bed charged with pelleted aluminum fluoride at a liquid hourly space velocity of 0.23 (contact time, 15 seconds); i. e., at a rate equal to 0.23 volume of liquid ortho-cresol per volume of catalyst per hour. The duration of the run was 10 hours. The product distribution was found to be 97.1% liquid, 1% gases and 1.9% carbon. The composition of the liquid was found to be 83.9% cresols, 6.8% phenol and 9.3% polymethyl phenols. The composition of the cresols was found to be 75.4% ortho-cresol, 15% meta-cresol and 9.1% para-cresol.

Example II (N9–57)

The process of Example I was repeated using aluminum fluosilicate as the catalyst. The product distribution was 98.5% liquid, 1.5% carbon and 0.5% gases. The composition of the liquid was 85.3% cresols, 6.7% phenol and 8.0% polymethylphenols. The composition of the cresols was 78.8% ortho-cresol, 15.2% meta-cresol, and 6.0% para-cresol.

Example III (N18–39)

The procedure of Example I was repeated using meta-ethylphenol as the procatalysate. The temperature was 450° C., the liquid hourly space velocity was 0.52, the length of the run was 4 hours. The product distribution was 92.2% liquid, 6% carbon and 1.8% gases. The composition of the liquid was found to be 72% ethylphenols, 17.5% phenol and 10.5% polyethylphenols. The distribution of the ethylphenols was found to be 12.8% ortho, 75.7% meta, and 11.5% para.

Example IV

The process of Example I was repeated using ortho-ethylphenol as the feed. The liquid hourly space velocity was 0.56, the temperature 450° C. and the duration 8 hours. The product distribution was 96.3% liquid, 1.7% carbon, 2% gases. The composition of the liquid was found to be 57.5% ethylphenol, 25.6 phenol, 16.9% polyethylphenols. The distribution of the isomers was found to be 46.6% ortho, 38.9% meta, and 14.5% para.

Example V (N18–43)

The procedure of Example I was repeated using paraethylphenol; the temperature was 450° C.; the liquid hourly space velocity was 0.48; the duration was 8 hours. The product distribution 96.1% liquid, 1.9% carbon, and 2% gases. The composition of the liquid was 61.6% ethylphenols, 19.8% phenol, 18.6% polyethylphenols. The distribution of the isomers was 16.9% ortho, 48.5% meta, and 34.6% para.

In the foregoing examples, both the temperature and the rate of throughput may be varied. Suitably the temperature may range from 300 to 600° C. and throughput from 0.1 to 10 volumes of liquid alkylphenol per volume of catalyst per hour. The pressure desirably is atmospheric.

While I have described my invention with reference to particular embodiments, it will be understood that it is not limited to any of the particularities thereof except as pointed out in the appended claims and that it may be variously embodied within the spirit and scope of the invention.

I claim:

1. In a process for catalytic isomerization, the steps of bringing an alkyl phenol fraction containing at least one isomerizable isomer into contact with a catalyst comprising an aluminum salt of a fluorine acid selected from the class consisting of hydrofluoric acid per se and hydrofluoric acid in complex combination as a Werner complex at a reactive temperature sufficient to convert a portion of said isomer to another isomer.

2. The process of claim 1 in which the aluminum salt is aluminum fluoride.

3. The process of claim 1 in which the aluminum salt is aluminum fluosilicate.

4. In a catalytic isomerization process, the step of bringing procatalysate consisting essentially of isomerizable alkyl phenol into contact with a catalyst comprising an aluminum salt of a fluorine acid selected from the class consisting of hydrofluoric acid per se and hydrofluoric acid in complex combination as a Werner complex at a reactive temperature sufficient to change the isomer distribution in the procatalysate.

5. The process of claim 4 in which the temperature is between 300 and 600° C. and the liquid hourly space velocity is between 0.1 and 10.

6. The process of claim 5 in which the pressure is atmospheric.

7. The process of claim 6 in which the aluminum fluoride is aluminum fluoride.

8. The process of claim 4 in which the temperature is between 300 and 600° C. and the liquid hourly space velocity is between 0.1 and 10 and the pressure is atmospheric and the aluminum salt is aluminum fluosilicate.

9. In a process for catalytic isomerization, the steps of bringing an alkylphenol fraction containing at least one isomerizable isomer in contact with a catalyst comprising a compound selected from the class consisting of aluminum fluoride and aluminum fluosilicate.

JOSEPH E. NICKELS.

REFERENCES CITED

The following references are of record in the file of this patent:

UNITED STATES PATENTS

| Number | Name | Date |
|---|---|---|
| 1,972,599 | Perkins et al. | Sept. 4, 1934 |
| 2,189,805 | Kyrides | Feb. 13, 1940 |
| 2,337,123 | Olin et al. | Dec. 21, 1943 |

OTHER REFERENCES

Ephraim: "Inorganic Chemistry"; 4th Ed., (1943). Pub. by Interscience Publishers, Inc., New York. Page 273. (1 page only.)